April 7, 1931. H. W. WILLIAMS 1,799,664
SAFETY DROP DEVICE FOR AVIATORS' USE
Filed Feb. 24, 1930
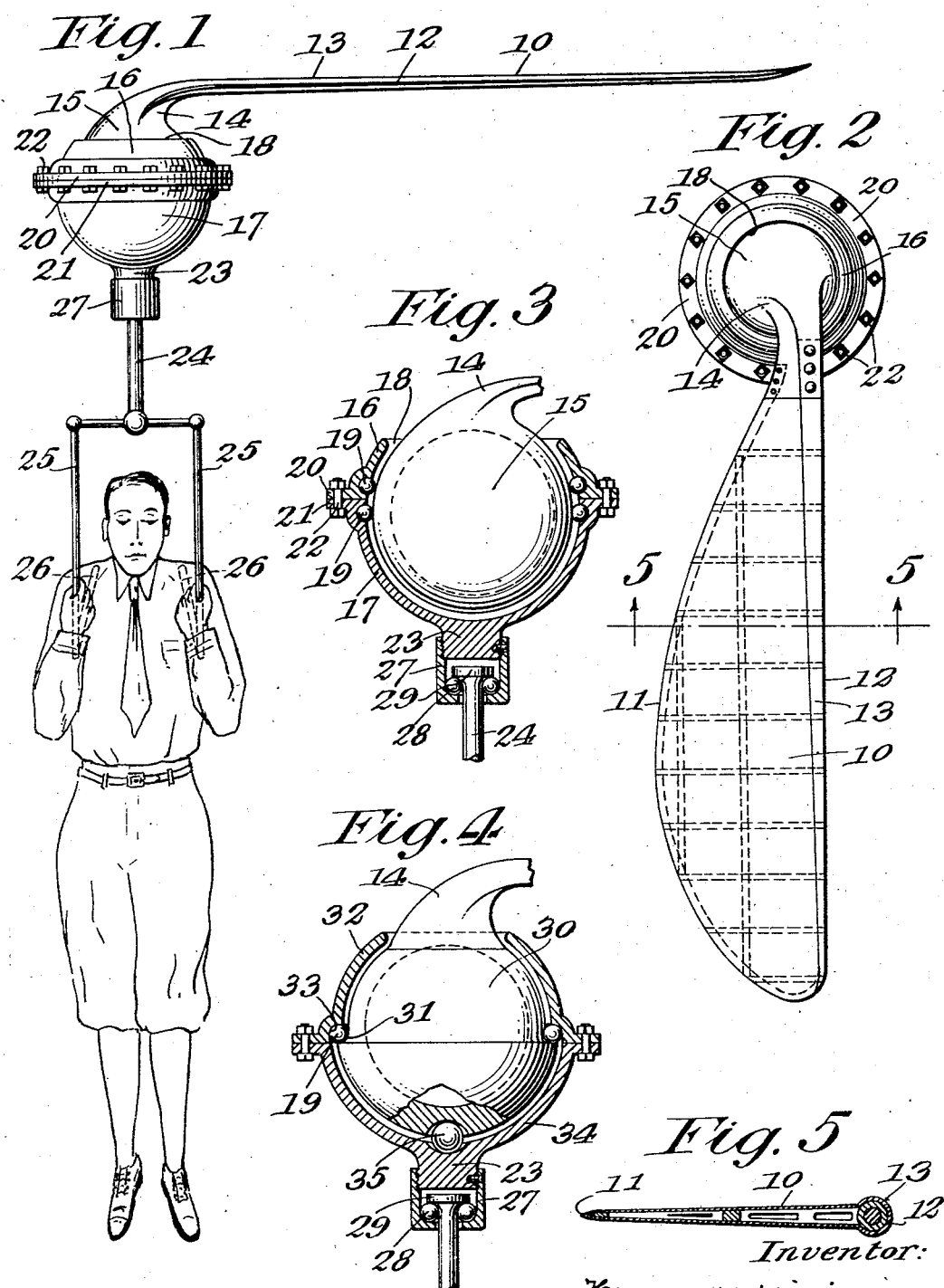
Inventor:
Hermann W. Williams
By Macleod, Calver, Copeland & Dike
Attorneys.

Patented Apr. 7, 1931

1,799,664

UNITED STATES PATENT OFFICE

HERMANN W. WILLIAMS, OF BOSTON, MASSACHUSETTS

SAFETY DROP DEVICE FOR AVIATORS' USE

Application filed February 24, 1930. Serial No. 430,788.

The invention relates to a new and useful improvement in a safety device for use in making a landing from an aeroplane or other vehicle of the air especially in case of mishap to the aeroplane or other air vehicle. The ordinary parachute of umbrella type which requires to be opened out from its collapsed or folded form for a safety descent sometimes fails to open at the critical time. The object of the present invention is to provide a safety landing device which does not require any preliminary opening but is always operative for a gliding descent as soon at it is attached to the body of the user.
The invention will be more fully understood from the following description when taken in connection with the accompanying drawings and the novel features thereof will be clearly pointed out and defined in the claims at the close of this specification.

In the drawings:

Fig. 1 is a side elevation showing the apparatus and the manner in which it is attached to the operator.
Fig. 2 is a plan view of the device.

Fig. 3 is a vertical sectional view on an enlarged scale, the harness being partly broken away.

Fig. 4 is a sectional view of a modified form of the device shown in Fig. 3.

Fig. 5 is a section on line 5—5 of Fig. 2.

Referring to the drawings:

There is shown at 10 the wing or blade which serves as the retarding element in making the descent. It is made of light, strong material, preferably having one side edge bowed outwardly as shown at 11, the opposite side edge being substantially straight like a chord of an arc, as shown at 12. In plan view it somewhat resembles in form the maple key or seed pod of some types of maple trees. The front edge of the wing is provided with a bead 13 which serves to stiffen the wing as a whole. One end of the wing merges into a neck 14 which extends at substantially a right-angle to the plane of the wing and terminates in a ball-shaped head 15, which is preferably spherical and is revolvably mounted in a socket. For convenience of assembling the parts the socket is preferably made of two shells 16, 17 fastened together. The upper shell 16 is formed with a mouth 18 through which the neck 14 of the head 15 of the wing extends.

Ball bearings 19 are provided for the head 15 within the shell to permit the head to readily rotate on its axis and thereby cause the wing 10 to sweep around on the same axis. In the form shown in Fig. 3 the head and wing can tip so that they are not limited to rotation on a vertical axis.

The said socket for the head 15 may be made of any suitable form, the only purpose of making it in two parts as described being to enable the head of the wing to be connected therewith. In the form of socket shown, the two shell members are provided with flanges 20 and 21 respectively which are clamped together by bolts 22.

The lower shell 17 is provided on its under side with a neck or stem 23 with which a suitable frame or harness is connected for ready attachment to the flyer who desires to make the descent from the aeroplane. In the form shown in the drawings, this harness consists of a frame having a shank 24 provided with two downwardly extending arms 25, 25 provided with hooks or loops 26 at their lower ends through which the arms of the user may be passed in such manner as to bring the loops up under his shoulders. Any other suitable means by which the harness may be readily attached to the wearer may be employed.

The shank 24 is pivotally connected at its upper end with the neck 23 of the shell 17. The connection should be such that the socket may easily rotate on its vertical axis with relation to the shank 24 of the harness. One method of making such connection is to provide a union 27 containing ball bearings 28, the shank 24 being provided with a flanged head 29 which rests on said bearings. It will thus be seen that the socket composed of the shells 16 and 17 is rotatable on a vertical axis when the user is in the vertical position as shown in the drawings and that the head 15 of the wing 10 is also rotatable on its axis independently of the rotation of the socket. If the said head 15 rotates on its vertical axis the wing 10 will sweep around in a horizontal plane and if the head 15 rotates on an inclined axis the wing will sweep around in an inclined plane at right angles to said axis.

Preparatory to making his descent from the aeroplane, the flyer will place the hooks or loops of the harness under his arms or thrust his arms through the loops to bring them up under his shoulders. When he has fallen a short distance after he releases himself from the aeroplane, the wing 10 will begin to rotate in a plane at right angles to the axis of rotation of the head 15 according to the air currents and he will come down gradually in a gliding or floating descent to the earth rather than by a straight vertical drop. The pressure of the air against the under face of the wing will retard the descent. The spinning movement of the wing in its own plane, that is, the swinging of the wing around the axis of rotation of the head, will steady the descent so that the passenger can remain in an upright position as shown in the drawings during the descent.

In the form shown in Fig. 4 the head 30 is formed with an annular shoulder 31 on its outer periphery and the upper socket member 32 is formed with an annular shoulder 33, thus providing a channel for the ball bearings 19. Preferably the head 30 and the lower socket member 34 are recessed to receive a ball bearing 35. The shoulders 31, 33 allow the head 30 to rotate only on its vertical axis so long as the hanger is in a vertical position and therefore the wing 10 can move only in a horizontal plane, that is, the plane of the wing is always maintained at a right angle to the hanger.

What I claim is:

1. A device of the character described comprising a wing having at one end a head extending at substantially right angles to the plane of the wing, a casing in which said head together with the wing is freely rotatable on an axis at an angle to the plane of the wing, and means suspended from the said casing whereby it may be attached to the person of the user.

2. A device of the character described comprising a wing having at one end a head extending at substantially right angles to the plane of the wing, a casing in which said head together with the wing is rotatable on an axis at a right angle to the plane of the wing, and a hanger suspended from the said casing having means whereby it may be attached to the person of the user.

3. A device of the character described comprising a wing having at one end a head extending at substantially a right angle to the plane of the wing, a casing in which said head is rotatable on an axis at a right angle to the plane of the wing, bearings for said head, a hanger suspended from the said casing having swivel connections therewith and means whereby it may be attached to the person of the user.

4. A device of the character described comprising a wing having at one end a substantially spherical head which extends at substantially a right angle to the plane of the wing, a casing in which said head is rotatable on an axis at a right angle to the plane of the wing, bearings for said head, a hanger suspended from the said casing having swivel connection therewith and means whereby the hanger may be attached to the person of the user.

5. A device of the character described comprising a wing which normally lies in a horizontal plane and has at one end a head which extends downward at substantially a right angle to the plane of the wing, a casing in which said head is rotatable on an axis at right angles to the plane of said wing, means whereby said casing may be attached to the person of the user, and connecting means between said casing and said attaching means whereby said casing is rotatable on its axis with relation to attaching means.

6. A device of the character described comprising a wing which has at one end a neck which extends downward at substantially a right angle to the plane of the wing, said neck terminating in a downwardly extending head, a casing in which said head is rotatable on an axis perpendicular to the plane of said wing, a hanger which extends downwardly from said casing, means connecting said hanger with said casing whereby the hanger is rotatable on its vertical axis with relation to said casing independently of the rotation of said head, and means whereby said hanger may be attached to the person of the user.

7. A device of the character described comprising a wing which has at one end a head which extends downward at substantially a right angle to the plane of the wing, said wing having stiffening means on one side edge thereof, a casing in which said head is rotatable on an axis perpendicular to the plane of said wing, and means whereby said casing may be attached to the person of the user.

8. A device of the character described comprising a wing having at one end a head which extends downward at substantially a right angle to the plane of the wing, one side edge of said wing being bowed outwardly in the same plane as the body of the wing and having a stiffening member on one edge thereof, a casing in which said head is rotatable on an axis perpendicular to the plane of said wing and a harness whereby said casing may be attached to the person of the user.

9. A device of the character described comprising a wing having a head extending at an angle to the plane of the wing, a casing in which said head is rotatable on an axis at an angle to the plane of the wing, a hanger suspended from the said casing having swivel connection therewith and means whereby it may be attached to the person of the user.

10. A device of the character described comprising a wing having a substantially spherical head which extends at an angle to the plane of the wing, a casing in which said head is rotatable on an axis at an angle to the plane of the wing, a hanger suspended from the said casing having swivel connection therewith and means whereby the hanger may be attached to the person of the user.

11. A device of the character described comprising a wing having a head which extends downward at an angle to the plane of the wing, a casing in which said head is rotatable on an axis at an angle to the plane of said wing and a harness whereby said casing may be attached to the person of the user.

In testimony whereof I affix my signature.

HERMANN W. WILLIAMS.